US008598978B2

(12) United States Patent
Knode

(10) Patent No.: US 8,598,978 B2
(45) Date of Patent: Dec. 3, 2013

(54) METHOD OF CONFIGURING A TWO-WAY WIRELESS LOAD CONTROL SYSTEM HAVING ONE-WAY WIRELESS REMOTE CONTROL DEVICES

(75) Inventor: Galen Edgar Knode, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 580 days.

(21) Appl. No.: 12/874,513

(22) Filed: Sep. 2, 2010

(65) Prior Publication Data
US 2012/0056712 A1 Mar. 8, 2012

(51) Int. Cl.
*G05B 23/02* (2006.01)

(52) U.S. Cl.
USPC ...... 340/3.7; 340/12.23; 340/12.29; 370/432; 370/433; 370/437; 370/445; 348/734; 341/176

(58) Field of Classification Search
USPC .............. 340/3.1–3.9, 12.23–12.29; 370/432, 370/433, 437, 445, 447; 348/734; 341/176
See application file for complete search history.

(56) References Cited

U.S. PATENT DOCUMENTS

| | | |
|---|---|---|
| 4,864,588 A | 9/1989 | Simpson et al. |
| 4,932,037 A | 6/1990 | Simpson et al. |
| 4,995,053 A | 2/1991 | Simpson et al. |
| 5,239,205 A | 8/1993 | Hoffman et al. |
| 5,340,954 A | 8/1994 | Hoffman et al. |
| 5,736,965 A | 4/1998 | Mosebrook et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,545,434 B2 | 4/2003 | Sembhi et al. |
| 6,687,487 B1 * | 2/2004 | Mosebrook et al. ......... 455/11.1 |
| 6,803,728 B2 | 10/2004 | Balasubramaniam et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,879,806 B2 | 4/2005 | Shorty |
| 6,927,547 B2 | 8/2005 | Walko, Jr. et al. |
| 6,980,080 B2 | 12/2005 | Christensen et al. |
| 7,089,066 B2 | 8/2006 | Hesse et al. |
| 7,102,502 B2 | 9/2006 | Autret |
| 7,106,261 B2 | 9/2006 | Nagel et al. |
| 7,126,291 B2 | 10/2006 | Kruse et al. |

(Continued)

*Primary Examiner* — George Bugg
*Assistant Examiner* — Sharmin Akhter
(74) *Attorney, Agent, or Firm* — Ostrolenk Faber LLP

(57) ABSTRACT

A radio-frequency (RF) load control system includes both two-way and one-way (e.g., transmit-only) remote control devices, and provides a simple, reliable process for configuring the one-way devices into the system. The one-way device may be programmed to operate at one of a predetermined number of radio frequencies as part of a frequency-selection procedure, during which the one-way device transmits a test command to a signal repeater of the system. If the test command is transmitted at the same frequency as the repeater, the repeater emits an audible beep to inform the user that the remote control is transmitting at the appropriate frequency. To associate the two-way devices with the system, the signal repeater streams an "enter address mode" command. To allow the one-way device to be associated with the system, the signal repeater pauses the transmission of the enter address mode command to allow the one-way device to transmit an activation request message to the signal repeater.

18 Claims, 8 Drawing Sheets

(56) References Cited

U.S. PATENT DOCUMENTS

| | | |
|---|---|---|
| 7,211,968 B2 | 5/2007 | Adamson et |
| 7,219,141 B2 | 5/2007 | Bonasia et al. |
| 7,307,542 B1 | 12/2007 | Chandler et al. |
| 7,346,016 B2 | 3/2008 | Nielsen et al. |
| 7,362,285 B2 | 4/2008 | Webb et al. |
| 7,391,297 B2 | 6/2008 | Cash et al. |
| 7,498,952 B2 | 3/2009 | Newman, Jr. |
| 7,573,208 B2 | 8/2009 | Newman, Jr. |
| 7,755,505 B2 | 7/2010 | Johnson et al. |
| 7,781,919 B2 * | 8/2010 | Black et al. ............ 307/141 |
| 7,796,057 B2 | 9/2010 | Swatsky et al. |
| 7,889,095 B1 * | 2/2011 | Harris et al. ............ 340/4.3 |
| 7,902,759 B2 * | 3/2011 | Newman, Jr. ............ 315/149 |
| 2003/0058107 A1 * | 3/2003 | Ferrier et al. ............ 340/571 |
| 2006/0192697 A1 | 8/2006 | Quick et al. |
| 2007/0110192 A1 | 5/2007 | Steiner |
| 2008/0055073 A1 | 3/2008 | Raneri et al. |
| 2008/0068204 A1 | 3/2008 | Carmen et al. |
| 2008/0095250 A1 | 4/2008 | Kim et al. |
| 2008/0111491 A1 | 5/2008 | Spira |
| 2008/0136663 A1 | 6/2008 | Courtney et al. |
| 2008/0278297 A1 | 11/2008 | Steiner et al. |
| 2009/0206983 A1 | 8/2009 | Knode et al. |
| 2009/0251352 A1 | 10/2009 | Altonen et al. |
| 2009/0315672 A1 * | 12/2009 | Nantz et al. ............ 340/5.26 |
| 2010/0052574 A1 | 3/2010 | Blakeley et al. |
| 2010/0052576 A1 | 3/2010 | Steiner et al. |
| 2010/0052894 A1 | 3/2010 | Steiner et al. |
| 2010/0207759 A1 | 8/2010 | Sloan et al. |
| 2010/0244706 A1 | 9/2010 | Steiner et al. |
| 2010/0244709 A1 | 9/2010 | Steiner et al. |

* cited by examiner

METHOD OF CONFIGURING A TWO-WAY WIRELESS LOAD CONTROL SYSTEM HAVING ONE-WAY WIRELESS REMOTE CONTROL DEVICES

BACKGROUND OF THE INVENTION

1. Field of the Invention

The present invention relates to a one-way radio frequency (RF) remote control device for use in lighting control systems. More particularly, the present invention relates to a method for selecting from one of a plurality of radio frequencies at which the one-way remote control device is to transmit during normal operation, and for activating, assigning, and/or associating the one-way remote control device to the lighting control system.

2. Description of the Related Art

Control systems for controlling electrical loads, such as electric lights, motorized window treatments, and fans, are known. Such control systems often use radio frequency (RF) transmission to communicate commands and data between two-way control devices in such systems. One example of a two-way RF lighting control system is disclosed in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

RF lighting control systems typically include a plurality of two-way control devices, such as, a wall-mounted load control device (e.g., a dimmer switch), a remote control device (e.g., a table-top or wall-mounted master control, or a car visor control), and one or more repeaters. The two-way control devices each include an RF antenna adapted to transmit and receive RF communication signals at a transmission frequency. The two-way control devices are each allocated a unique short device address during an addressing procedure, such that they can communicate commands and data to and from other two-way control devices in the system. The repeater helps to ensure error-free communication by repeating the RF signals so as to ensure that every device in the system reliably receives the RF signals, even in the presence of RF-attenuating structures such as walls, ceilings, and floors. In the prior art RF lighting control systems, the repeater has previously chosen from one of sixteen possible transmission frequencies at which to operate. The transmission frequency will be one that is relatively noise-free and free of interference from other systems possibly operating in the vicinity.

The addressing procedure, which provides for allocation of the short device addresses to each of the control devices, is executed during configuration of the RF lighting control system. In the RF lighting control system described in the '442 patent, the addressing procedure is initiated at a repeater of the lighting control system (e.g., by pressing and holding a button on the repeater), which places all repeaters of the system into an "addressing mode." The main repeater is responsible for allocating short device addresses to the RF control devices (e.g., master controls, wall-mounted load control devices, etc.) of the control system. The main repeater allocates a short device address to an RF control device in response to a request for an address sent by the control device. To initiate a request for the address, a user moves to one of the wall-mounted or table-top control devices and presses a button on the control device. The control device transmits a signal associated with the actuation of the button, which is received and interpreted by the main repeater as a request for an address. In response to the request for address signal, the main repeater allocates and transmits a next available short device address to the requesting control device.

Some simple prior art RF lighting control systems have included a one-way RF remote control devices that can only transit commands to the load control device being controlled (and the master or repeater devices). An example of a one-way RF remote control device is described in greater detail in commonly-assigned U.S. patent application Ser. No. 12/399,126, filed Mar. 6, 2009, entitled WIRELESS BATTERY-POWERED REMOTE CONTROL HAVING MULTIPLE MOUNTING MEANS, the entire disclosure of which is hereby incorporated by reference.

If the remote control device is a two-way device, i.e., includes a transmitter and receiver, selecting the transmission frequency and assigning the remote control device to the control system can be done automatically by the master or repeater device because the remote control device can both receive commands from the master device and/or repeater and transmit information (i.e., its device or serial number) to the master and/or repeater device. For example, the remote control device can be configured to cycle through operating frequencies until the frequency of operation of the system is determined and thereafter inform the system of its presence. If the remote control device, on the other hand, is a one-way device, some other method must be developed to select the frequency of operation that is consistent with the repeater or master's frequency of operation and to assign the remote control device to the system. In addition, since the one-way remote control device cannot receive digital messages from the main repeater, the one-way remote control device cannot be allocated an address using the addressing procedure of the '442 patent.

Therefore, there exists a need for a single RF load control system that includes both one-way and two-way remote control devices, and that provides a simple, reliable process for configuring the one-way remote control devices into the system.

SUMMARY OF THE INVENTION

According to an embodiment of the present invention, a method of associating a radio frequency transmit-only remote control device with a radio frequency load control system comprises: (1) transmitting a plurality of enter address mode commands to a plurality of two-way control devices that transmit and receive RF control signals to control operation of electrical loads; (2) pausing the transmission of the enter address mode commands for a predetermined period of time before repeating the transmission of the enter address mode commands; (3) entering the transmit-only remote control device into an activation mode of operation; (4) transmitting from the transmit-only remote control device an activation request message command that includes a unique identifier of the transmit-only remote control device; (5) at a receiving control device of the load control system, receiving the activation request message from the transmit-only remote control device during the step of pausing the transmission of the enter address mode commands; and (6) if the activation request message has been received, checking a memory of the receiving device to determine if the unique identifier is already stored, and, if not already stored, storing the unique identifier in the memory to associate the transmit-only remote control device with the load control system. The transmit-only remote control device, when in the activation mode, transmits a plurality of activation request messages wherein the plurality of activation request messages are transmitted for a length of time that exceeds a length of time that the plurality of enter address mode commands are transmitted so that an activation request message will be present during at least part of the pause so that the receiving device can receive the activation request message during the pause.

In addition, a radio frequency (RF) load control system for controlling the amount of power delivered from an AC power source to a plurality of electrical loads is also described herein. The system comprises a plurality of two-way control devices operable to transmit and receive RF control signals to control the operation of the electrical loads, a one-way remote control device operable to transmit RF control signals to one or more of the two-way control devices to control the operation of the electrical loads, and a main controller. The main controller is operable to transmit a plurality of enter address mode commands to the two-way control devices, and pause the transmission of the enter address mode commands for a predetermined period of time before repeating the transmission of the enter address mode commands. The one-way remote control device is operable to enter into an activation mode, and transmit an activation request message that includes a unique identifier of the one-way remote control device. The main controller is further operable to receive the activation request message from the one-way remote control device while the transmission of the enter address mode commands is paused. The main controller checks a memory of the main controller to determine if the unique identifier is already stored when the activation request messages has been received, and stores the unique identifier in the memory to assign the one-way remote control device to the load control system if the unique identifier is not already stored. The one-way remote control device, when in the activation mode, transmits a plurality of activation request messages wherein the plurality of activation request messages are transmitted for a length of time that exceeds a length of time that the plurality of enter address mode commands are transmitted so that an activation request message will be present during at least part of the pause so that the main controller can receive the activation request message during the pause.

Other features and advantages of the present invention will become apparent from the following description of the invention that refers to the accompanying drawings.

DETAILED DESCRIPTION OF THE INVENTION

Figure 1:
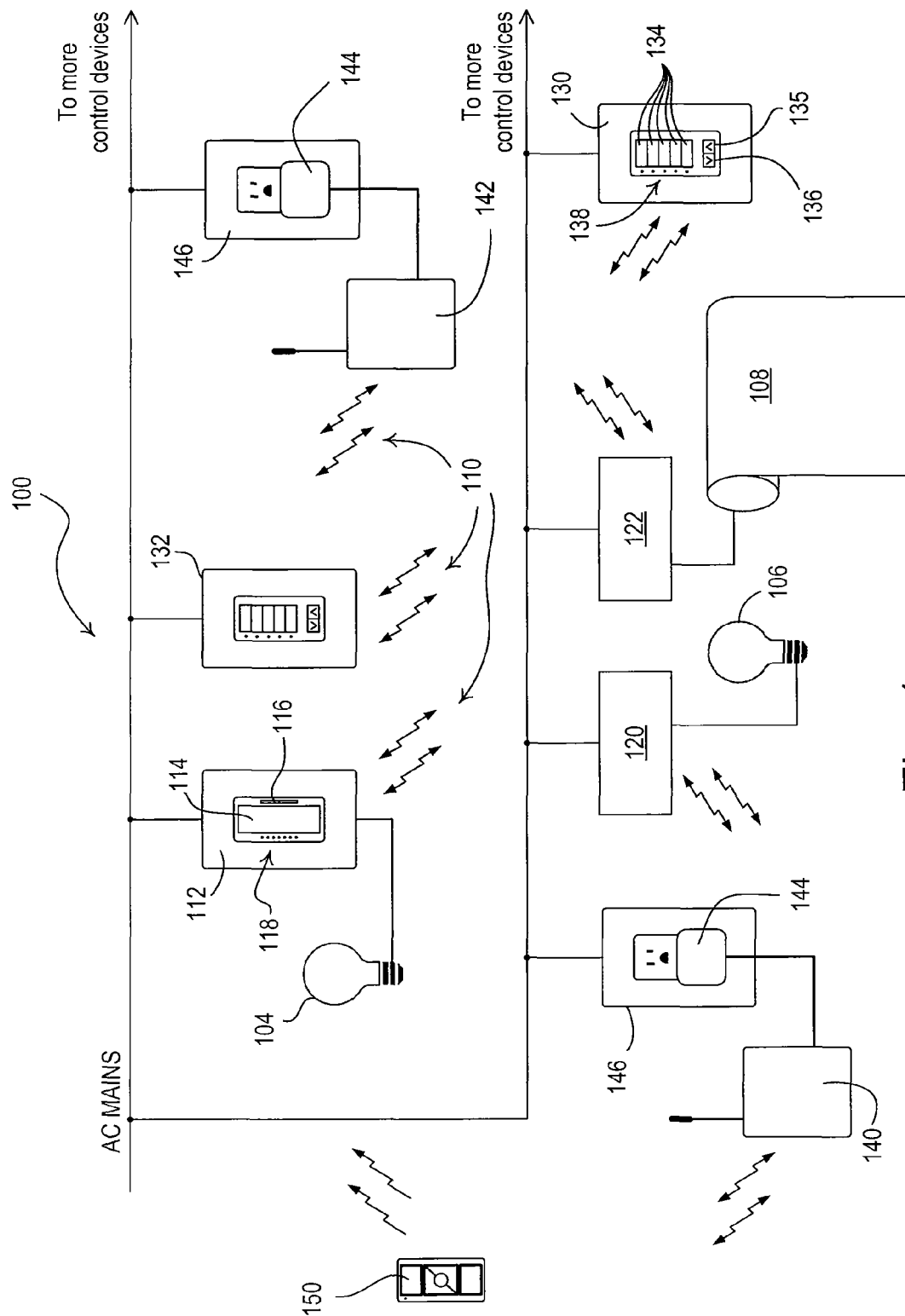
FIG. 1 is a simplified block diagram of a radio frequency (RF) load control system.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a radio frequency (RF) load control system 100 according to an embodiment of the present invention. The RF load control system 100 is operable to control the power delivered from a source of AC power (e.g., an AC mains voltage, such as 120 VAC @60 Hz) to a plurality of electrical loads, for example, lighting loads 104, 106 and a motorized roller shade 108. The RF load control system 100 utilizes a two-way wireless RF communication link for communication of digital messages between the control devices of the system via wireless RF signals 110 at a transmission frequency $f_{TX}$. The two-way control devices of the RF load control system 100 comprise, for example, a wall-mounted dimmer 112, a remote dimming module 120, a motorized window treatment (MWT) control module 122, a first wall-mounted master keypad 130, a second wall-mounted master keypad 132, and signal repeaters 140, 142. Each of the two-way control devices is allocated a short device address (i.e., a unique identifier) during configuration of the load control system 100 to allow each of the control devices to transmit digital messages to and receive digital message from the other two-way control devices according to predetermined protocol. According to the embodiment of the present invention, the two-way control devices of the RF load control system 100 communicate the digital messages using a time division technique, i.e., each control device transmits a digital message during predetermined time slots.

The wall-mounted dimmer 112 and the remote dimming module 120 are each operable to toggle the respective lighting load 104, 106 on and off, and to control the intensity of the respective lighting load 104, 106 between a minimum intensity and a maximum intensity, i.e., across dimming range of the lighting load. The wall-mounted dimmer 112 includes a user interface for receiving inputs from a user and for providing feedback of the intensity of the controlled lighting load 104 to the user. Specifically, the dimmer 112 comprises a control actuator 114 for turning on and off (i.e., toggling) the lighting load 104 and an intensity adjustment actuator 116 (e.g., a slider control or a rocker switch) for adjusting the intensity of the lighting load. The wall-mounted dimmer 112 also comprises one or more visual indicators 118, e.g., light-emitting diodes (LEDs), for providing feedback to the user of the dimmer. The remote dimming module 120 is typically mounted near the lighting fixture of the controlled lighting load 106, and may comprise, for example, an electronic dimming ballast for controlling a fluorescent lamp or an LED driver for an LED light source. The MWT control module 122 is coupled to the motorized roller shade 108 (which is typically mounted in from of a window) for controlling the position of the shade fabric of the roller shade and thus the amount of daylight entering the space. The MWT control module 122 may be located inside the roller tube of the motorized roller shade 108.

The first and second wall-mounted master keypads 130, 132 each comprise a plurality of preset buttons 134, which may be programmed, for example, to recall lighting presets or toggle the lighting loads 104, 106 on and off. The keypads 130, 132 may also comprise a raise button 135 and a lower button 136 for respectively raising and lowering the intensities of the lighting loads 104, 106. The preset buttons 134, the raise button 135 and the lower button 136 may also be programmed to control the position of the motorized roller shade 108. The keypads may also comprise a plurality of visual indicators 138 (e.g., LEDs) for display feedback of, for example, which preset is selected or which lighting loads 104, 106 are energized.

In response to an actuation of one of the buttons 134, 135, 136, the keypads 130, 132 transmit addressed "command" digital messages via the RF signals 110 to the wall-mounted dimmer 112, the remote dimming module 120, and the MWT control module 122 to control the associated loads. The wall-mounted dimmer 112 is also operable to transmit command messages in response to actuations of the control actuator 114 and the intensity adjustment actuator 116. After receiving a command message, the two-way control devices of the load control system 100 are operable to transmit acknowledgement (ACK) messages to the two-way control device that originated the command message (i.e., the originating control device). Each of the control devices of the load control system 100 is operable to transmit a new command message when the RF communication link is idle, i.e., no control devices are presently transmitting RF signals 110. The originating control device is operable to re-transmit the command message multiple times to ensure that all control devices within the command message range of the originating control device receive the command message.

The signal repeaters 140, 142 retransmit any received digital messages to ensure that all of the two-way control devices of the load control system receive all of the RF signals 110. The system may comprise, for example, one to five signal repeaters depending upon the physical size of the load control system 100. Each of the two-way control devices of the load control system 100 are located within the communication range of one of the signal repeaters 140, 142. The signal repeaters 140, 142 are powered by the AC mains voltage via power supply 144 plugged into electrical outlets 146. According to the embodiment of the present invention, one of the signal repeaters (e.g., signal repeater 140) operates as a "main" repeater (i.e., a main controller) to facilitate the operation of the load control system 100. The main repeater 140 has a database, which defines the operation of the load control system, stored in memory. For example, the main repeater 140 is operable to determine which of the lighting loads 104, 106 is energized and to use the database to control the visual indicators 118, 138 of the dimmer 112 and the keypads 130, 132 accordingly to provide the appropriate feedback to the user of the load control system 100.

Each of the two-way control devices may store a portion of the database pertaining to the functionality of the specific control device. For example, each of the keypads 130, 132 may store a portion of the database that determines which lighting presets are selected in response to actuations of the preset buttons 134. Accordingly, if the database directs that a first preset is selected in response to an actuation of the first preset button 134, the keypads 130, 132 are operable to transmit an appropriate "preset" command message (i.e., for the first preset). However, some control devices of the load control system 100 may not have an appropriate amount of memory to store even a portion of the database. Therefore, these control devices alternatively transmit "button" command messages that simply include information regarding which one of the buttons was pressed rather than, for example, a specific preset.

Figure 2:
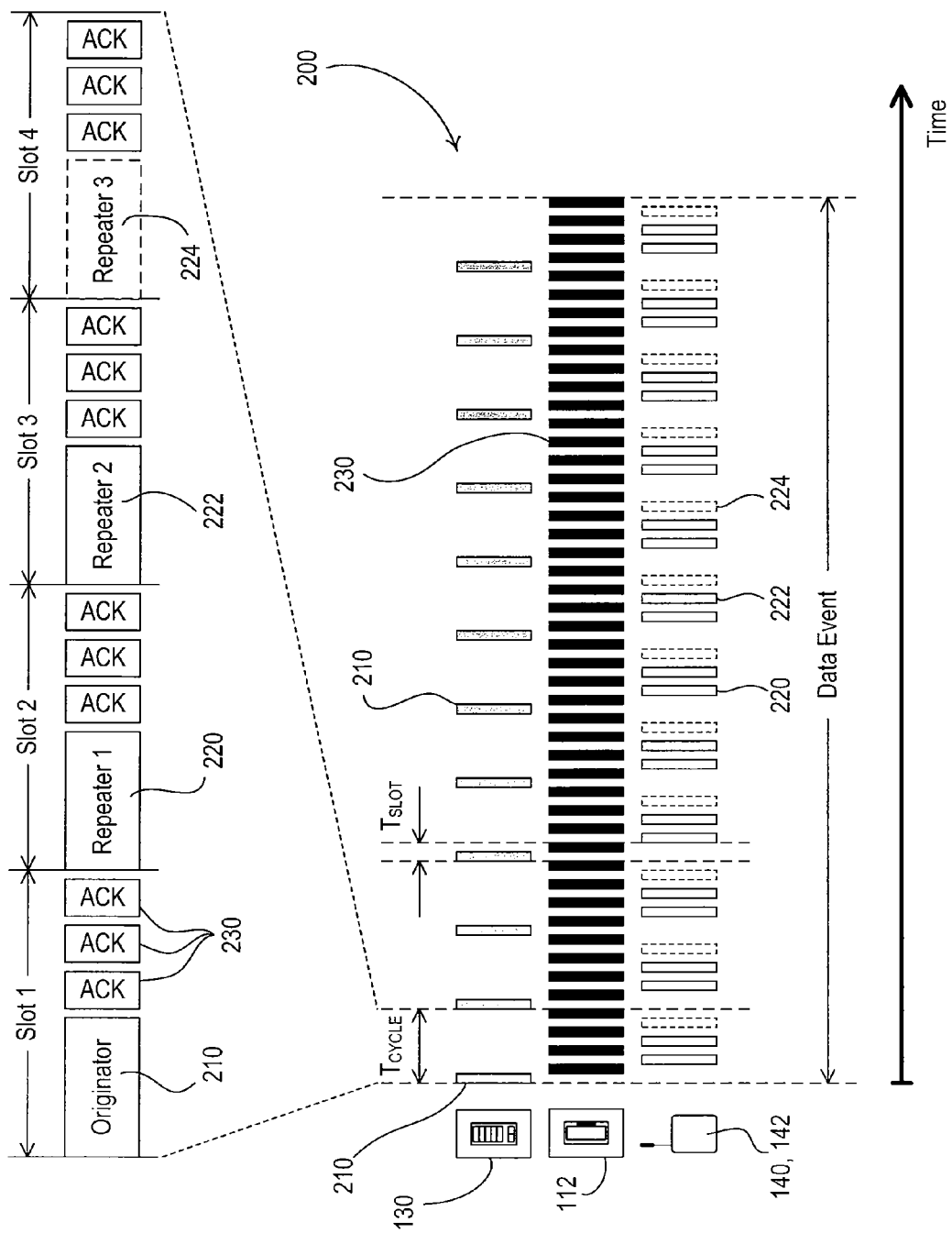
FIG. 2 is a simplified timing diagram showing an example of the digital messages transmitted by each of a plurality of two-way control devices of the load control system of FIG. 1 during a data event.

FIG. 2 is a simplified timing diagram showing an example of the timing of the digital messages transmitted by each of the two-way control devices of the load control system 100 during a data event 200, which begins with the first transmission of a command message 210. In the example of FIG. 2, the originating two-way control device is the keypad 130 and the load control system 100 comprises the two signal repeaters (i.e., the main repeater 140 and an additional repeater 142). The command message 210 is transmitted multiple times, e.g., twelve times, as shown in FIG. 2. The main repeater 130 may be operable to change how many times the command message 210 is retransmitted depending upon how many signal repeaters 140, 142 are in the RF load control system 100.

The time period between consecutive transmissions of the command message 210 by the originating control device is defined as a "cycle" and is, for example, 75 msec in length. Each cycle is split up into multiple "slots", e.g., four slots when there are up to three signal repeaters in the load control system 100. During the first slot of each cycle, the originating control device (i.e., the keypad 130) is operable to transmit the command message 210. During the second and third slots, the two signal repeaters 140, 142 are operable to transmit respective repeater messages 220, 222, which are simply re-transmissions of the original command message 210. If the system 100 included a third signal repeater, the third signal repeater would transmit a repeater message 224 during the fourth slot of each cycle. When the load control system 100 includes more than three signal repeaters, the length of each cycle is increased, such that each cycle comprises five or six slots if the system has four or five signal repeaters, respectively. Each two-way control device of the load control system 100 may determine the number of signal repeaters and the resulting cycle time during configuration of the load control system.

After the command message 210 or the repeater messages 220, 222, 224 are transmitted, there are three ACK sub-slots in each slot in which the two-way control devices of the load control system 100 (e.g., the wall-mounted dimmer 112) may transmit acknowledgement messages 230 in response to the command message 210. Each of the two-way control devices has predetermined ACK sub-slots during which the control device may transmit the acknowledgement message 230. Specifically, each two-way control device is provided with two ACK sub-slots during each command message event. The specific ACK sub-slots may be determined by each two-way control device during configuration of the load control system. The protocol of the RF load control system 100 is described in greater detail in co-pending, commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

Referring back to FIG. 1, the RF load control system 100 also comprises a one-way RF remote control device 150. The one-way remote control device 150 can only transmit digital messages via the RF signals 110 and cannot receive digital messages via the RF signals (i.e., the one-way remote control device operates as a transmit-only device). The RF signals 110 transmitted by the one-way remote control device 150 may be received by the dimmer 112, as well as the keypads 130, 132 and the repeaters 140, 142, that are within the transmission range of the one-way remote control device. The one-way remote control device 150 may be activated (i.e., assigned to the load control system 100) and may be programmed to operate with one or more of the two-way remote control devices (e.g., the dimmer 112). The dimmer 112 operates in response to the one-way remote control device 150 if the dimmer is in transmission range of the one-way remote control device and if the dimmer has been programmed to operate with the one-way remote control device. The one-way remote control device 150 must be assigned to the RF load control system 100, and programmed to a particular dimmer 112 that is part of the system, as will be described in greater detail below.

Figure 3:
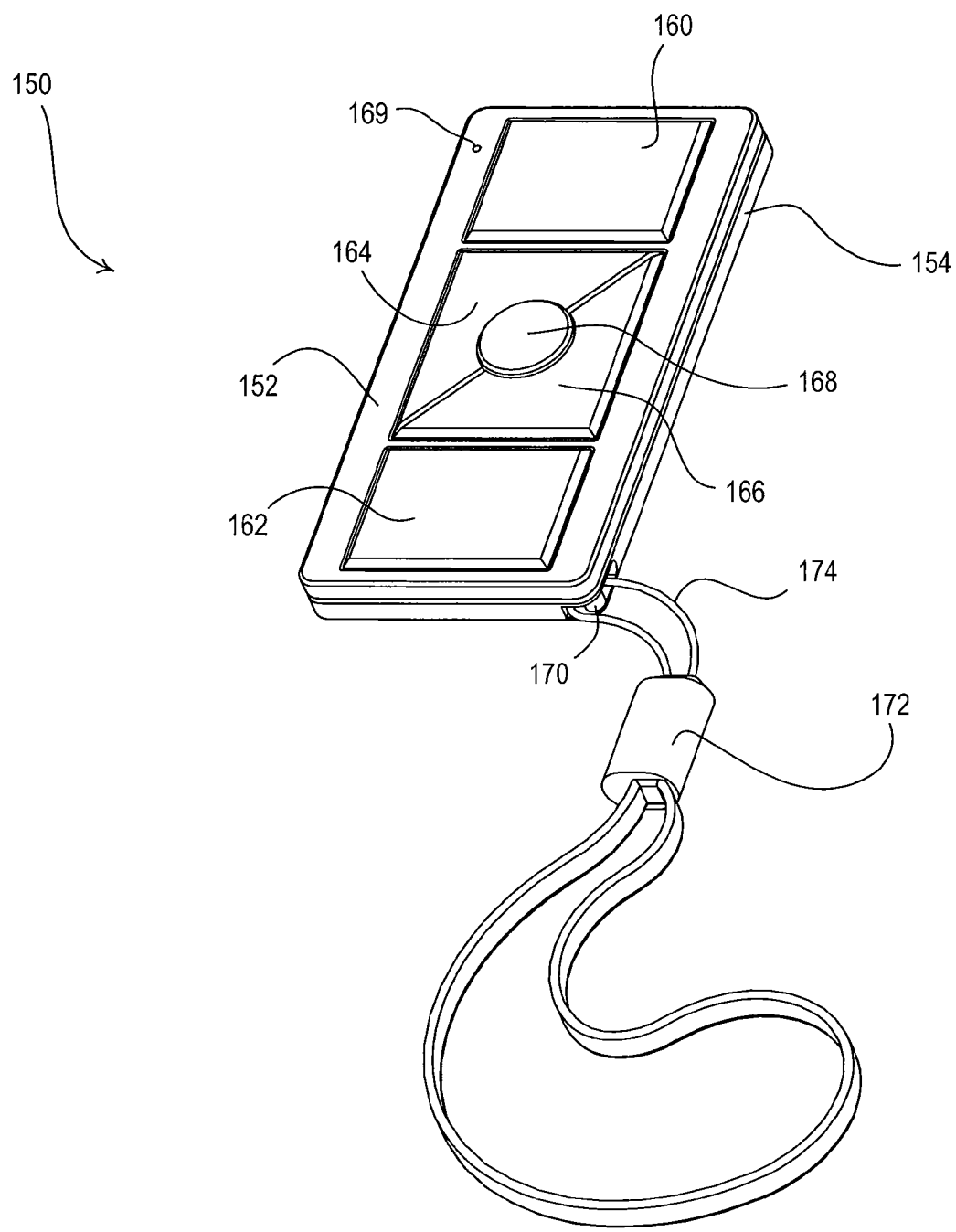
FIG. 3 is a perspective view of a one-way transmit-only remote control device of the system of FIG. 1.

FIG. 3 is a perspective view of the one-way remote control device 150 of FIG. 1. The one-way remote control device 150 comprises a housing that includes a front enclosure portion 152 and a rear enclosure portion 154. The one-way remote control device 150 further comprises a plurality of actuators: an ON button 160, an OFF button 162, a RAISE button 164, a LOWER button 166, and a PRESET button 168. The one-way remote control device 150 also comprises a visual indicator 169, e.g., a light-emitting diode (LED), which is illuminated in response to actuation of one of the buttons 160-168. The one-way remote control device 150 transmits commands via the RF signals 110 to the dimmer 112 and the repeaters 140, 142 in response to actuations of the buttons 160-168. The particular embodiment shown in FIG. 3 includes an attachment post 170, a lanyard 172, and a loop portion 174.

Figure 4:
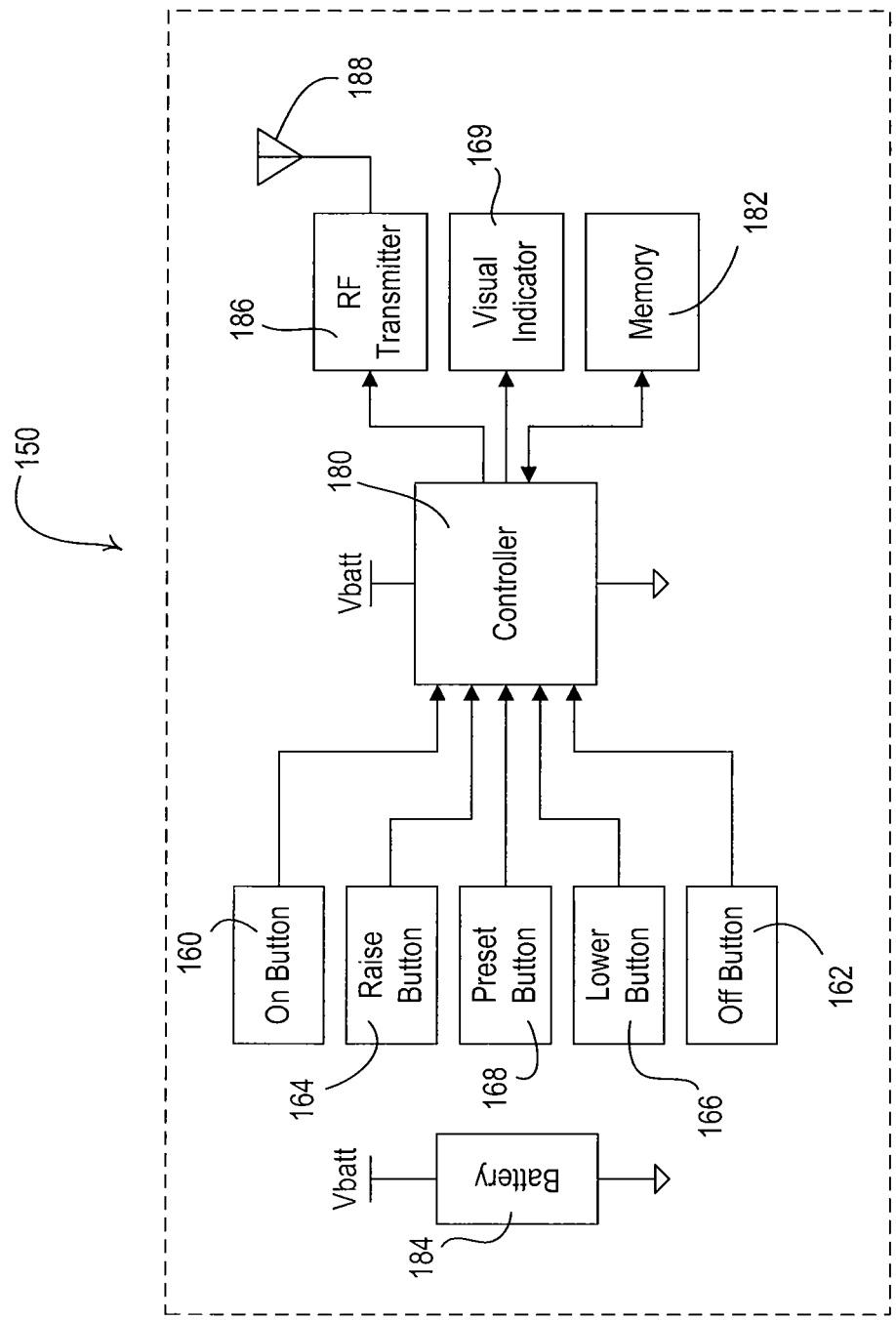
FIG. 4 is a simplified block diagram of the remote control device of FIG. 3.

FIG. 4 is a simplified block diagram of the one-way remote control device 150 of FIG. 3. The one-way remote control device 150 comprises a controller 180 that is operable to receive inputs from the buttons 160-168 and to control the visual indicator 169. The one-way remote control device 150 further comprises memory 182 for storage of information, such as, for example, a serial number for the remote control device 150. A battery 184 provides a DC voltage $V_{BATT}$ (e.g., approximately three volts) for powering the controller 180, the memory 182, and other low-voltage circuitry of the one-way remote control device 150. The one-way remote control device 150 further includes an RF transmitter 186 coupled to the controller 180 and an antenna 188. In response to an actuation of the buttons 160-168, the controller 180 causes the RF transmitter 186 to transmit a packet of information, including which button has been actuated, to the dimmer switch 112, the repeaters 140, 142, or the other two-way control devices of the load control system 100 via the RF signals 110.

The first step in associating the one-way remote control device 150 with the RF load control system 100 is to ensure that the one-way remote control device is using the same transmission frequency $f_{TX}$ as the two-way control devices of the RF load control system. If the one-way remote control device 150 is already using the same transmission frequency $f_{TX}$ as the two-way control devices of the RF load control system 100, nothing needs to be done. However, if the one-way remote control device 150 is not using the same transmission frequency $f_{TX}$ and the two-way control devices cannot presently receive digital messages from the one-way remote control device, a user must perform a frequency selection procedure 300 to adjust the transmission frequency $f_{TX}$ of the one-way remote control device. For example, the transmission frequency $f_{TX}$ may be adjusted between a minimum transmission frequency $f_{MIN}$ (e.g., approximately 431.5 kHz) and a maximum transmission frequency $f_{MAX}$ (e.g., approximately 436.6 kHz), and may be stepped up or down by a predetermined value $\Delta f_{TX}$ (e.g., approximately 0.3 kHz). The one-way remote control device 150 may initially operate at a default frequency $f_{BD}$ (e.g., approximately 433.6 kHz).

Figure 5:
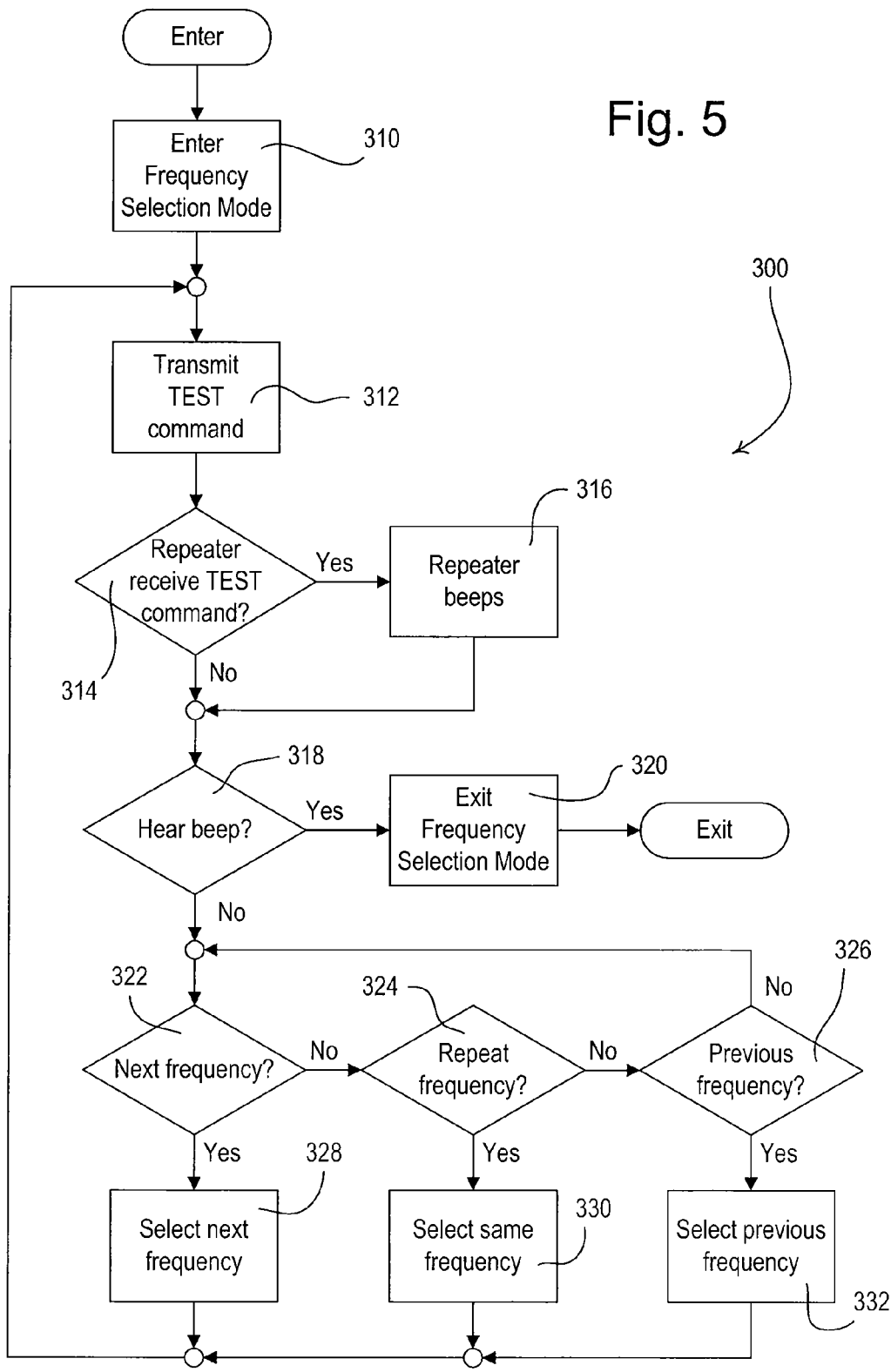
FIG. 5 is a simplified flowchart of the method of selecting the transmission frequency of the remote control device of FIG. 3.

FIG. 5 is a simplified flowchart of the frequency selection procedure 300 for selecting the transmission frequency $f_{TX}$ of the one-way remote control device 150 according to the embodiment of the present invention. At step 310, the one-way remote control device 150 first enters a frequency-selecting mode of operation. For example, the one-way remote control device 150 may be put into the frequency-selecting mode of operation by cycling power to the remote control device (e.g., removing the battery 184 from the remote control device, and then re-installing the battery in the remote control device) while simultaneously holding down the ON button 160, the OFF button 162, and the PRESET button 168, for three seconds, until the visual indicator 169 begins flashing. Alternatively, the user could press and hold the ON button 162 for a first predetermined period of time (e.g., approximately three to six seconds) to enter a programming mode, and then press and hold the PRESET button 168 for a second predetermined period of time (e.g., approximately three to six seconds) to enter the frequency-selecting mode.

At step 312, the controller 180 then transmits a TEST command to the signal repeaters 140, 142 on the frequency at which the one-way remote control device 150 is currently configured to operate. If the TEST command is transmitted at the same frequency at which the repeater is operating (i.e., if the repeater heard the TEST command) at step 314, the repeater will provide a human-perceptible indication of receipt of the TEST command at step 316. In one embodiment, the human-perceptible command takes the form of an audible sound, such as a loud beep. When a user hears the beep at step 318, the user exits the frequency-selecting mode at step 320 by holding PRESET button 168 for a predetermined period of time (e.g., approximately three to six seconds). After the predetermined time has passed, the visual indicator 169 stops flashing to indicate that the transmission frequency $f_{TX}$ of the remote control device 150 has been set to the same transmission frequency as the repeater.

If the user does not hear the beep at step 318, then the user may choose to either try a new (i.e., the next) transmission frequency at step 322, repeat the same transmission frequency at step 324, to go back to the previous transmission frequency at step 326. To select the next transmission frequency, the user taps (i.e., presses momentarily) the ON button 160 to select the next frequency (e.g., the one-way remote control device 150 increments the transmission frequency $f_{TX}$ by the predetermined value $\Delta f_{TX}$, i.e., approximately 0.3 kHz) at step 328, and the frequency selection procedure 300 loops around to transmit the TEST command at the next frequency at step 312. To repeat the same frequency, the user taps the PRESET button 168 at step 330, and the frequency selection procedure 300 loops around to try a transmission of the TEST command at the same frequency at step 312. To select the previous frequency, the user taps the OFF button 162 at step 332, and the frequency selection procedure 300 loops around to transmit the TEST command at the previous frequency at step 312. By these operations, the user may cycle through the sixteen possible transmission frequencies until the appropriate transmission frequency is found, which will be indicated by at least one of the repeaters 140, 142 emitting the loud beep. As before, the transmission frequency $f_{TX}$ is set, and the frequency-selecting mode of operation is exited by pressing and holding the PRESET button for the required amount of time at step 320.

Now that the one-way remote control device 150 is operating on the same transmission frequency $f_{TX}$ as the other control devices of the RF load control system 100 (or if the one-way remote control device was already using the same transmission frequency $f_{TX}$), the one-way remote control device may be assigned to the RF load control system. This can be accomplished in one of several ways.

Figure 6:
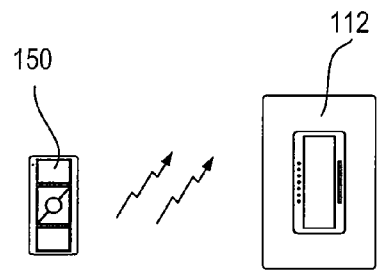
FIG. 6 shows a simplified system diagram illustrating a first way of addressing the remote control.

The first assignment method is known as "association" and occurs in a peer-to-peer system as shown in FIG. 6. In the peer-to-peer system, the one-way remote control device 150 communicates directly with the dimmer 112 with which it is to operate (i.e., the dimmer to be controlled by the one-way remote control device 150). The one-way remote control device 150 is operable to be associated directly with the dimmer 112 using either a forward or reverse programming mode. An example of a peer-to-peer system is described in greater detail in co-pending, commonly-assigned U.S. patent application Ser. No. 11/559,166, filed Nov. 13, 2010, entitled RADIO-FREQUENCY LIGHTING CONTROL SYSTEM, the entire disclosure of which is hereby incorporated by reference.

In the reverse assignment mode, the device that is to be controlled, i.e., the dimmer 112, is placed in an association mode by holding a button or buttons on the device for a preset period of time, for example, approximately six seconds. Then, the user goes to the one-way remote control device 150 and operates the one-way remote control device to associate it with that dimmer 112. The one-way remote device 150 then transmits the unique serial number stored in the memory 182 to the dimmer 112, which stores the unique serial number in a memory of the dimmer to thus associate the one-way remote control device to the dimmer.

In the forward assignment mode, the one-way remote control device 150 is placed in an association mode by pressing a particular button or buttons, e.g., for approximately six seconds. The one-way remote control device 150 then transmits the unique serial number stored in the memory 182 to the dimmer 112. Then, the user goes to the dimmer 112 (to be controlled) and places the dimmer in the association mode by holding down an assigned button or buttons for a preset period of time. The dimmer 112 then receives the signal having the unique serial number from the one-way remote control device 150 to thus associate that one-way remote control device with that dimmer.

Figure 7:
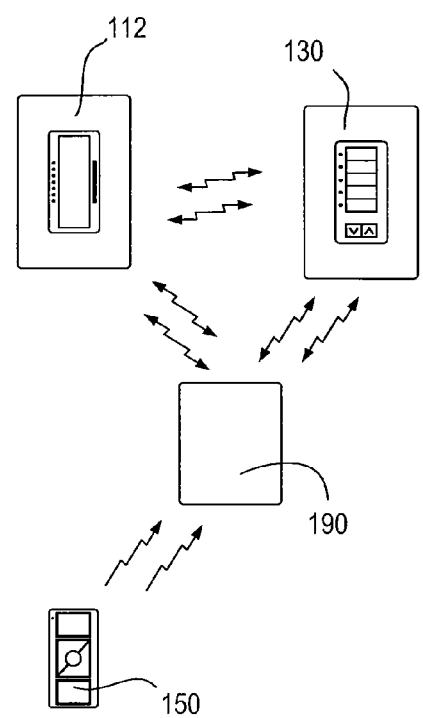
FIG. 7 shows a simplified system diagram illustrating a second way of addressing the remote control.

In a second assignment method, shown in FIG. 7, a separate programming box 190 is used during configuration of the load control system 100 to "activate" the one-way remote control device 150 (i.e., assign the one-way remote control to the system) and "program" the one-way remote control to operate with a particular dimmer 112. The assignment of the remote control device 150 to the load control system 100 according to the second assignment method can also be performed in a forward or reverse mode. In the forward mode, the assignment function is originated at the one-way remote control device 150 and in the reverse programming mode the assignment function is originated at the dimmer 112.

When the one-way remote control device 150 is "activated", the programming box 190 stores the unique serial number of the one-way control device 150 is a memory. The operation of the one-way remote control device 150 may then be "programmed," i.e., causing a particular device, e.g., the one-way remote control device, to operate a particular control device, e.g., the dimmer 112. Thus, after activating a one-way remote control device 150, the steps of programming are used to cause that one-way remote control device to operate the specific control device (e.g., the dimmer 112). The programming box 190 causes the controlled device (e.g., the dimmer 112) to store the appropriate programming data along with the serial number of the one-way control device 150 in the memory, such that the dimmer 112 knows to how to respond to digital messages received from the one-way remote control device. Note that in the "association" method of the peer-to-peer system of FIG. 6, both the steps of "activating" and "programming" (both allocation of an address to the remote control device and programming the operation of the remote control device with the load control device (i.e., the dimmer 112) are combined into a single step, i.e., association.

Figure 8:
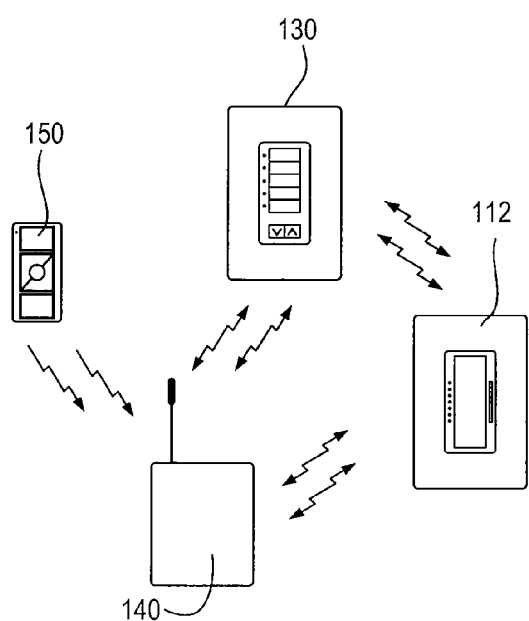
FIG. 8 shows a simplified system diagram illustrating a third way of addressing the remote control.
Figure 9:
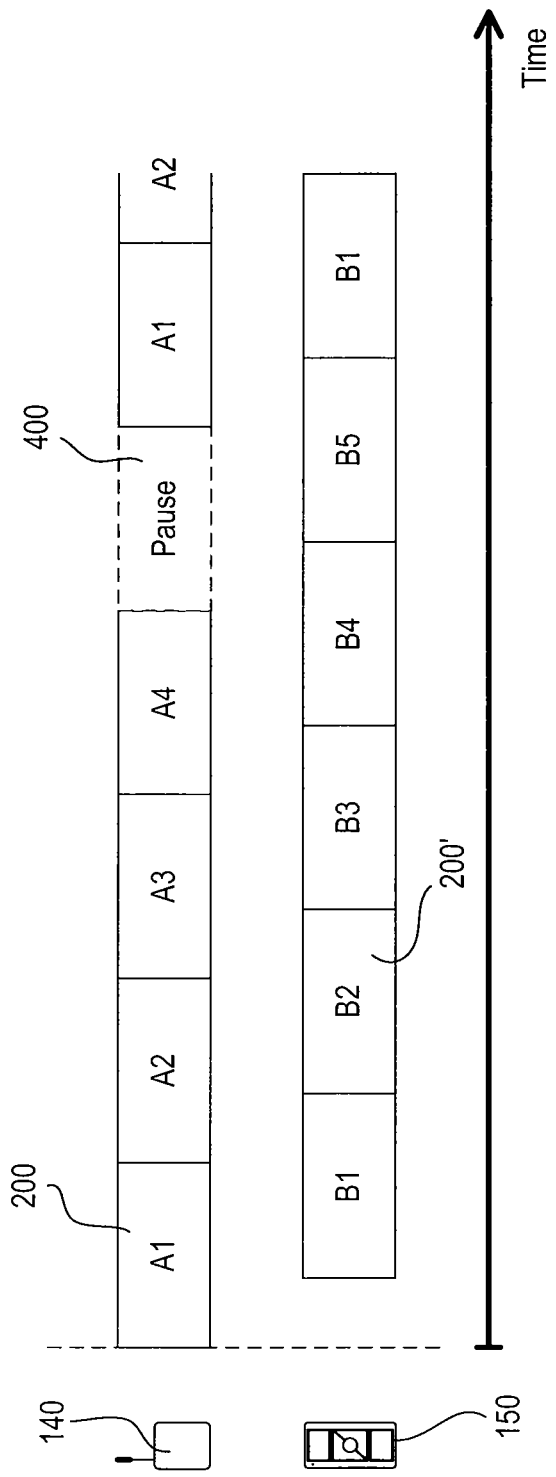
FIG. 9 shows a timing diagram for illustrating how signals from the transmit-only remote control device are received at a repeater.

In yet a third assignment method, the one-way remote control device 150 is assigned to the RF load control system 100 via the main repeater 140, as shown in FIG. 8. FIG. 9 is a timing diagram showing how the main repeater 140 transmits digital messages during the third assignment method in order to assign the one-way remote control device 150 to the RF load control system 100. During an activation (i.e., addressing) mode of the third activation method, the main repeater 140 repeatedly transmits (i.e., streams) an "enter address mode" command (i.e., an original command message 210 as shown in FIG. 2) to the two-way control devices of the RF load control system 100 as part of consecutive two-way data events 200. Upon receiving the enter address mode command, the two-wire control devices of the RF load control system 100 may request an address from the main repeater by transmitting acknowledgement messages 230 in response to the enter address mode command (as shown in FIG. 2). The main repeater 140 may then cease transmission of the enter address mode command in response to receiving an acknowledgement message 230 in order to assign an address to the two-way control device that transmitted the acknowledgement message. When complete, the main repeater 140 may generate an audible sound to indicate that the assignment has been made.

When placed in an activation mode, the one-way remote control device 150 is operable to periodically transmit (i.e., stream) an activation request message to the main repeater 140 as part of consecutive one-way data events 200'. The one-way remote control device 150 may be placed into the activation mode, for example, by holding a particular button or buttons on the remote control device for a predetermined period of time, for example, approximately six seconds. During each one-way data event 200', the one-way remote control device 150 periodically repeats the activation request message a predetermined number (e.g., approximately twelve) times, with a predetermined period (e.g., approximately 75 msec) between the beginning of each transmission. The activation request message includes the unique identifier of the one-way remote control device 150, and may be, for example, approximately 10 msec long. As a result, each of the one-way data events 200' is approximately the same length as the two-way data events 200 generated by the main repeater 140 and other two-way control devices of the load control system 100 (e.g., approximately 900 msec).

The one-way remote control device 150 is not able to receive the enter address mode command from the main repeater 140 and thus cannot properly time the transmission of an acknowledgement message 230 during the two-way data events 200. In other words, the one-way remote control device 150 is only operable to transmit digital messages asynchronously with respect to the digital messages transmitted by the main repeater 140 and other two-way control devices. Accordingly, the main repeater 140 is operable to periodically pause the transmission of the enter address mode commands in order to allow the one-way remote control device 150 to transmit to the main repeater an activation request message indicating that the one-way remote control device is in an addressing mode. Specifically, the main repeater 140 is operable to transmit the enter address mode command to the two-way control devices for a predetermined number (e.g., four) of consecutive two-way data events 200, and then cease transmission of the enter address mode command during a pause event 400 as shown in FIG. 9. During the pause event 400, the main repeater 140 is then able to receive the activation request message from the one-way remote control device 150.

The pause event 400 should be long enough and occur frequently enough that at least one pause event 400 will occur while the one-way remote control device 150 is streaming the activation request message. For example, the pause event 400 may be equal in length to the length of each of the two-way data events 200 (e.g., approximately 900 msec). Since the lengths of the two-way data events 200 are approximately equal to the lengths of the one-way data events 200', the total amount of time that is required for the main repeater 140 to transmit the four consecutive two-way data events 200 and the pause 400 is approximately equal to the amount of time required for the one-way remote control device 150 to transmits five consecutive one-way data events 200' (as shown in FIG. 9).

In all of the three above-reference activation methods, the one-way remote control device 150 transmits an RF signal 110 including a unique identifier, for example, a device serial number, to the receiving device, i.e., either the main repeater 140, the programming box 190, or directly by the dimmer 112. For example, in the third activation method of FIG. 8, the one-way remote control device 150 may transmit a unique serial number along with the activation request message. When a device receives the RF signal including the unique identifier from the one-way remote control device 150, the receiving device checks in its internal memory to determine if the serial number is present. If the serial number is present, the device is already assigned to the system. If the serial number is not present in the memory, the receiving device adds it into the memory so that the device is now assigned to the RF load control system 100. After making the assignment, the device may generate an audible sound to indicate that the assignment between the one-way remote control device 150 and the RF load control system 100 has been completed.

In the case of the peer-to-peer association, once the one-way remote control device 150 is associated with the dimmer 112, the one-way remote control device can now control the dimmer to the desired settings. The dimmer 112, being a two-way control device, informs its master keypad 132, via any repeaters if necessary, of the new settings. When the main repeater is used to assign a remote one-way transmitter device to the system, the repeater thereafter transmits the address of the remote control device to the system. Now that the device is addressed, the remote control device can now be programmed to control a particular dimmer device. For example, the programming may be completed by using a "walk-around" programming method, which is similar to the steps of the peer-to-peer association shown in and described with reference to FIG. 6.

Figure 10:
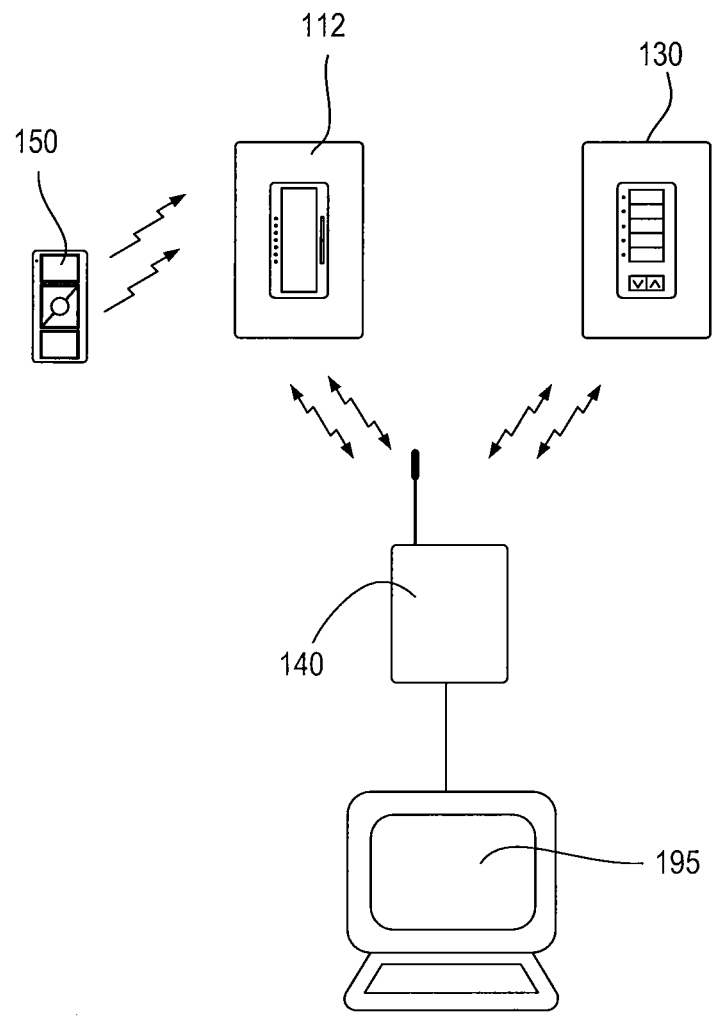
FIG. 10 shows a simplified system diagram illustrating yet another method of addressing a remote control device to the load control system using a GUI equipped device such as a PC.

Another alternative programming method is to use a personal computer (PC) 195 or other GUI (graphical user interface) equipped device as shown in FIG. 10. The PC 195 is connected to download data to the main repeater 140, 142, and can be used to both activate and program the operation of the one-way remote control device 150. The user then defines the operation of the one-way remote control device 150 with a load control device of the system 100, i.e., a dimmer 112, using the GUI equipped device. The GUI equipped device builds a database of the programming of the one-way remote control devices with the corresponding two-way control devices. This database is then downloaded to the main repeater 140, which broadcasts at least portions of the database to the respective load control devices to inform these devices of the one-way remote control device programmed to operate them.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of assigning a radio frequency transmit-only remote control device to a radio frequency load control system, the load control system comprising a plurality of two-way control devices that transmit and receive RF control signals to control the operation of electrical loads, the method comprising:
　　transmitting a plurality of enter address mode commands to the two-way control devices;
　　pausing the transmission of the enter address mode commands for a predetermined period of time before repeating the transmission of the enter address mode commands;
　　entering the transmit-only remote control device into an activation mode;
　　transmitting from the transmit-only remote control device an activation request message that includes a unique identifier of the transmit-only remote control device;
　　at a receiving control device of the load control system, receiving the activation request message from the transmit-only remote control device during the step of pausing the transmission of the enter address mode commands; and
　　if the activation request message has been received, checking a memory of the receiving device to determine if the unique identifier is already stored, and, if not already stored, storing the unique identifier in the memory to assign the transmit-only remote control device to the load control system;
　　wherein the transmit-only remote control device, when in the activation mode, transmits a plurality of activation request messages wherein the plurality of activation request messages are transmitted for a length of time that exceeds a length of time that the plurality of enter address mode commands are transmitted so that an activation request message will be present during at least part of the pause so that the receiving device can receive the activation request message during the pause.

2. The method of claim 1, wherein the step of entering the remote control device into an activation mode of operation comprises holding an actuator on the remote control device for a predetermined time period whereby the remote control device enters the activation mode.

3. The method of claim 1, wherein, at the receiving device, the receiving device enters the activation mode at predetermined times whereby the receiving device transmits a plurality of enter address mode commands followed by a pause before repeating the enter address modes commands.

4. The method of claim 1, wherein the unique identifier comprises a serial number of the remote control device.

5. The method of claim 1, wherein the remote control device is assigned to the load control system by storing the unique identifier in the receiving device memory and further comprising transmitting to other receiving devices of the load control system an indication of the assignment of the remote control device to the load control system.

6. The method of claim 5, further comprising:
providing a graphical user interface equipped device with software defining all load control devices that are part of the load control system;
programming the remote control device to operate a specified load control device;
building a database including the programming of the remote control devices and load control devices; and
downloading the database to the load control system.

7. The method of claim 6, wherein the step of downloading the database to the load control system comprises downloading the database into a memory of a main repeater of the load control system.

8. The method of claim 7, further comprising:
transmitting, via RF signals from the main repeater to the control devices of the load control system, selected parts of the database to inform the load control devices of the programming between respective load control devices and remote control devices.

9. The method of claim 6, further comprising:
performing a programming procedure at a load control device of the load control system to program the remote control device to control the load control device.

10. The method of claim 9, wherein the step of performing a programming procedure comprises holding an actuator of the remote control device for a predetermined period of time, whereby the remote control device provides an RF signal to the load control device, and further comprising holding an actuator on the load control device for a predetermined period of time, whereby the load control device receives the RF signal from the remote control device, and programs the remote control device to operate the load control device, whereby the remote control device can control the load control device.

11. The method of claim 1, wherein the step of determining of the address command is being received is performed at a repeater of the load control system.

12. The method of claim 1, wherein the step of determining if the address command is being received is performed at a device that is used at set-up of the load control system to program the assignment of remote control devices to load control devices of the system.

13. The method of claim 1, further comprising:
providing the remote control device with a system address in the load control system by assigning the unique identifier with the system address.

14. A radio frequency (RF) load control system for controlling the amount of power delivered from an AC power source to a plurality of electrical loads, the system comprising:
a plurality of two-way control devices operable to transmit and receive RF control signals to control the operation of the electrical loads;
a one-way remote control device operable to transmit RF control signals to one or more of the two-way control devices to control the operation of the electrical loads; and
a main controller operable to transmit a plurality of enter address mode commands to the two-way control devices, and pause the transmission of the enter address mode commands for a predetermined period of time before repeating the transmission of the enter address mode commands;
wherein the one-way remote control device is operable to enter into an activation mode, and transmit an activation request message that includes a unique identifier of the one-way remote control device, the main controller operable to receive the activation request message from the one-way remote control device while the transmission of the enter address mode commands is paused, the main controller further operable to check a memory of the main controller to determine if the unique identifier is already stored when the activation request messages has been received, and store the unique identifier in the memory to assign the one-way remote control device to the load control system if the unique identifier is not already stored;
wherein the one-way remote control device, when in the activation mode, transmits a plurality of activation request messages wherein the plurality of activation request messages are transmitted for a length of time that exceeds a length of time that the plurality of enter address mode commands are transmitted so that an activation request message will be present during at least part of the pause so that the main controller can receive the activation request message during the pause.

15. The system of claim 14, further comprising:
a graphical user interface equipped device with software defining all load control devices that are part of the load control system, the graphical user interface equipped device operable to program the one-way remote control device to operate a specified two-way control device, build a database including the programming of the one-way remote control device and the corresponding two-way load control device, and download the database to the load control system.

16. The system of claim 15, wherein the graphical user interface equipped device is operable to download the database into the memory of the main controller.

17. The system of claim 16, wherein the main controller is operable to transmit to the control devices of the two-way control system selected parts of the database to inform the two-way control devices of the programming between respective two-way control devices and one-way remote control devices.

18. The system of claim 15, wherein the graphical user interface equipped device comprises a personal computer.

* * * * *